United States Patent [19]
Goossens et al.

[11] Patent Number: 4,937,026
[45] Date of Patent: Jun. 26, 1990

[54] METHOD OF SURFACE IMPREGNATING HOT POLYCARBONATE SHEET WITH AN ULTRAVIOLET RADIATION SCREENER COMPOSITION

[75] Inventors: John C. Goossens, Mt. Vernon; Ronald F. Sieloff, Evansville, both of Ind.

[73] Assignee: General Electric Company, Pittsfield, Mass.

[21] Appl. No.: 285,136

[22] Filed: Dec. 16, 1988

[51] Int. Cl.$^5$ ........................ B29C 47/00; B05D 7/02
[52] U.S. Cl. .................... 264/129; 264/171; 264/211.12; 264/344; 427/160
[58] Field of Search ................ 264/129, 171, 211.12, 264/344; 428/412; 427/160

[56] References Cited

U.S. PATENT DOCUMENTS

| | | | |
|---|---|---|---|
| 4,146,658 | 3/1979 | Humphrey | 427/160 |
| 4,322,455 | 3/1982 | Olson et al. | 427/160 |
| 4,323,597 | 4/1982 | Olson | 427/160 |
| 4,349,607 | 9/1982 | Ching | 428/412 |
| 4,396,644 | 8/1983 | Taniyama et al. | 427/160 |
| 4,503,180 | 3/1985 | Ching | 524/293 |
| 4,556,606 | 12/1985 | Olson | 428/412 |
| 4,600,647 | 7/1986 | Robeson et al. | 428/412 |
| 4,776,913 | 10/1988 | Goossens et al. | 264/171 |
| 4,792,465 | 12/1988 | Silbermann et al. | 427/160 |

FOREIGN PATENT DOCUMENTS

| | | | |
|---|---|---|---|
| 2211641 | 9/1973 | Fed. Rep. of Germany | 428/412 |
| 54-047771 | 4/1979 | Japan | 264/129 |
| 58-084767 | 5/1983 | Japan | 428/412 |
| 60-192734 | 10/1985 | Japan | 264/129 |

Primary Examiner—Jan H. Silbaugh
Assistant Examiner—Allan R. Kuhns
Attorney, Agent, or Firm—Spencer D. Conard

[57] ABSTRACT

An ultraviolet radiation screening composition for on-line surface impregnating hot polycarbonate sheet. The composition includes an ultraviolet radiation screener and carrier solution which contains respective amounts of dipropylene glycol methyl ether, tripropylene glycol methyl ether, 1,2 propanediol and 1,4 butanediol. The carrier solution provides a desired level of volatility and aggressiveness for on-line surface impregnation of hot aromatic polycarbonate sheet and film.

3 Claims, No Drawings

METHOD OF SURFACE IMPREGNATING HOT POLYCARBONATE SHEET WITH AN ULTRAVIOLET RADIATION SCREENER COMPOSITION

BACKGROUND OF THE INVENTION

1. Field of the Invention

This invention relates to an ultraviolet radiation screening composition for surface impregnating polycarbonate sheet and more particularly relates to an ultraviolet radiation screening composition for on-line surface impregnating hot polycarbonate sheet with an ultraviolet radiation screener.

2. Description of Related Art

The vast majority of all organic polymeric materials undergo some mode of degradation when exposed to the high energy photons of ultraviolet radiation. The degradation manifests itself depending on the polymeric material in yellowing, discoloration, embrittlement and other loss of physical properties. Polycarbonate resin is no exception and it is, therefore, an object of this invention to provide a method of producing a polycarbonate resin article which is highly resistant to ultraviolet light degradation.

The use of ultraviolet radiation absorbers with various resins such as polyesters, polyolefins, vinyls, and polystyrene to provide protection against attack by ultraviolet radiation is known in the art. The ultraviolet radiation absorber functions by reason of its ability to screen out the damaging ultraviolet portion of light due to its very high absorptivity relative to that of the polymer. In order to qualify as a successful ultraviolet light absorber for a polymer, particularly for polycarbonate, there are several requirements which the absorber must fulfill. The absorber must have a high specific absorptivity in the range of wave lengths that are most deleterious to the polymer and that are present in the source of the exposure. The absorber must be compatible with the polymer such as polycarbonate and must not degrade the polymer with the loss of properties and increase in color. The absorber must not significantly absorb in the visible region of the spectrum or a color will be imparted to the polymer to which it has been added. The absorber must also have a sufficiently low volatility to permit its continued residence in the polymer.

Several methods are known in the prior art utilizing these ultraviolet radiation absorbers to stabilize various polymers, including polycarbonate, against ultraviolet radiation. These methods include blending the ultraviolet radiation absorbers with the polymer prior to processing, incorporating the absorbers in surface laminating or coating materials which are applied onto the surface of the processed polymer; and impregnating the absorbers in the polymer surface. The surface impregnation techniques known in the prior art include (i) using aggressive solvents to swell or soften the polymer surface thereby allowing the absorber to diffuse into the softened surface of the polymer; (ii) melting the absorber and the polymer surface in order to diffuse the molten absorber into the molten polymer surface; and (iii) partitioning of the absorber between a polymeric surface and a relatively poor solvent for the absorber held at high temperatures whereby the absorber, which is more soluble in the polymer than in the solvent, diffuses into the polymer surface.

While each of these methods can be utilized to impart improved ultraviolet stability to a polymer system, each of them has certain disadvantages. Blending the absorber with the bulk polymer results in the absorber being distributed throughout the entire polymer system. This procedure is both uneconomical, as these absorbers are usually quite expensive, and not completely successful. Since most of the absorber resides in the polymers interior instead of at the surface where it is most needed, much of the harmful ultraviolet radiation penetrates and deteriorates the surface of the polymer structure before reaching the majority of the interiorly distributed absorber. Furthermore, since the concentration of the absorber in the resin is limited by the degree of compatibility of the absorber with the polymer, using sufficiently high concentrations of absorber effective to provide surface protection generally tends to adversely affect the physical properties of the polymer. Incorporating the absorbers in surface laminating or coating materials suffers from the disadvantage of being generally difficult and expensive to use since an extra complicated processing step is required. Furthermore, difficulties are sometimes encountered in adhering the coating or laminating material to the surface of the polymer, or in maintaining continued adequate adhesion, especially after exposure to weathering. Even when the coating or laminating material adheres well, it often cannot be applied without forming unsightly streaks on the polymer surface. An additional drawback to this method is that often the physical properties of the polymer, such as impact strength, are adversely affected by these coating or laminating materials.

The surface impregnation techniques are the most desirable since the ultraviolet radiation absorbers are contained only in the surface regions of the polymer where they are needed, and ideally the surface impregnation step would be part of the on-line process for production of the sheet. Thus, for mass production of ultraviolet radiation stabilized polycarbonate sheet, it would be desirable to be able to surface impregnate the hot polycarbonate sheet as it leaves the sheet producing extrusion die. Prior surface impregnating compositions, however, do not provide an adequate processing window to permit consistant production of on-line, high quality, surface impregnated polycarbonate sheet. Such compositions are either (i) too volatile at the elevated sheet temperatures, for example temperatures in excess of 180° F., encountered immediately following sheet production downstream from the extruder thus not allowing for adequate surface impregnation thereby leaving excess oily absorber on the surface which will collect dust unless washed off in a subsequent washing step or (ii) such compositions at elevated temperatures are so aggressive to polycarbonate that they unduly attack the surface of the sheet thereby reducing the optical quality thereof.

Thus, one object of the present invention is to provide an ultraviolet radiation screener composition for on-line surface impregnating hot polycarbonate sheet as the sheet is produced.

SUMMARY OF THE INVENTION

The present invention provides an ultraviolet radiation screening composition for on-line surface impregnation of hot polycarbonate sheet. The composition having an ultraviolet radiation screener and a specific carrier solution. The carrier solution contains respective amounts of dipropylene glycol methyl ether, tripropylene glycol methyl ether, 1,2 propanediol and 1,4 butanediol. The carrier solution provides the desired level of volatility and aggressiveness for on line surface impregnation of hot aromatic polycarbonate sheet and film.

DETAILED DESCRIPTION OF THE INVENTION

The present invention provides an ultraviolet radiation screening composition for on-line surface impregnation of hot polycarbonate sheet. The composition provides for the production of polycarbonate sheet having effective levels of ultraviolet radiation resistance and having surfaces of high optical quality. The screener composition of the present invention has an ultraviolet radiation screener in a specific carrier solution. The carrier solution has respective amounts of dipropylene glycol methyl ether, tripropylene glycol methyl ether, 1,2 propanediol and 1,4 butanediol.

It is contemplated that the ultraviolet radiation absorbers employable in the practice of this invention are any of the known ultraviolet radiation absorbing compounds which function by reason of their ability to screen out the damaging ultraviolet portion of light due to their very high absorptivity in this region of the spectrum and which are soluble in the carrier solution of the present invention. These contemplated compounds include benzophenones including benzophenone derivatives, benzotriazole including benzotriazole derivatives, benzoate esters, phenyl salicylates, derivatives of crotonic acid, malonic acid esters, and cyanoacrylates.

Included among the ultraviolet radiation absorbers which fall into the categories of benzophenone derivatives and benzotriazole derivatives are those compounds disclosed in U.S. Pat. Nos. 3,309,220; 3,049,443 and U.S. Pat. No. Re. 2,976, all of which are incorporated herein by reference. Some non-limiting examples of these compounds include:
2,2'-dihydroxybenzophenone;
2,2',4,4'-tetrahydroxybenzophenone;
2,2'-dihydroxy-4,4'-dimethoxybenzophenone;
2,2'-dihydroxy-4,4'-diethoxybenzophenone;
2,2'-dihydroxy-4,4'-dipropoxybenzophenone;
2,2'-dihydroxy-4,4'-dibutoxybenzophenone;
2,2'-dihydroxy-4-methoxy-4'-ethoxybenzophenone;
2,2'-dihydroxy-4-methoxy-4'-propoxybenzophenone;
2,2'-dihydroxy-4-methoxy-4'-butoxybenzophenone;
2,2'-dihydroxy-4-ethoxy-4'-propoxybenzophenone;
2,2'-dihydroxy-4-ethoxy-4'-butoxybenzophenone;
2,3'-dihydroxy-4,4'-dimethoxybenzophenone;
2,3'-dihydroxy-4-methoxy-4'-butoxybenzophenone;
2-hydroxy-4,4',5'-trimethoxybenzophenone;
2-hydroxy-4,4',6'-tributoxybenzophenone;
2-hydroxy-4-butoxy-4',5'-dimethoxybenzophenone;
2-hydroxy-4-ethoxy-2',4'-dibutylbenzophenone;
2-hydroxy-4-propoxy-4',6'-dichlorobenzophenone;
2-hydroxy-4-propoxy-4',6'-dibromobenzophenone;
2,4-dihydroxybenzophenone;
2-hydroxy-4-methoxybenzophenone;
2-hydroxy-4-ethoxybenzophenone;
2-hydroxy-4-propoxybenzophenone;
2-hydroxy-4-butoxybenzophenone;
2-hydroxy-4-methoxy-4'-methylbenzophenone;
2-hydroxy-4-methoxy-4'-ethylbenzophenone;
2-hydroxy-4-methoxy-4'-propylbenzophenone;
2-hydroxy-4-methoxy-4'-butylbenzophenone;
2-hydroxy-4-methoxy-4'-tertiary butylbenzophenone;
2-hydroxy-4-methoxy-4'-chlorobenzophenone;
2-hydroxy-4-methoxy-2'-chlorobenzophenone;
2-hydroxy-4-methoxy-4'-bromobenzophenone;
2-hydroxy-4,4'-dimethoxybenzophenone;
2-hydroxy-4,4'-dimethoxy-3-methylbenzophenone;
2-hydroxy-4,4'-dimethoxy-2'-ethylbenzophenone;
2-hydroxy-4,4',5'-trimethoxybenzophenone;
2-hydroxy-4-ethoxy-4'-methylbenzophenone;
2-hydroxy-4-ethoxy-4'-ethylbenzophenone;
2-hydroxy-4-ethoxy-4'-propylbenzophenone;
2-hydroxy-4-ethoxy-4'-butylbenzophenone;
2-hydroxy-4-ethoxy-4'-methoxybenzophenone;
2-hydroxy-4,4'-diethoxybenzophenone;
2-hydroxy-4-ethoxy-4'-propoxybenzophenone;
2-hydroxy-4-ethoxy-4'-butoxybenzophenone;
2-hydroxy-4-ethoxy-4'-chlorobenzophenone;
2-hydroxy-4-ethoxy-4'-bromobenzophenone;
2-(2'-hydroxy-5'-methylphenyl)-benzotriazole;
2-(2'-hydroxy-5'-5345-butylphenyl)-benzotriazole;
2-(2'-hydroxy-3'-methyl-5'-tert-butylphenyl)-benzotriazole;
2-(2-'hydroxy-5'-cyclohexylphenyl)-benzotriazole;
2-(2'-hydroxy-3',5'-dimethylphenyl)-benzotriazole;
2-(2'-hydroxy-5'-tert-butylphenyl)-5-chloro-benzotriazole; and
2-(2'-hydroxy-3'-di-tert-butylphenyl)-benzotriazole.

Two non-limiting examples of the derivatives of crotonic acid which function as ultraviolet radiation absorbers are alpha-cyano-beta-(p-methoxyphenyl)-crotonic acid methyl ester and alpha-cyanobeta-N-(2-methyl-indolinyl)-crotonic acid methyl ester. The benzoate ester ultraviolet radiation absorbing compounds include the $C_8$–$C_{20}$ alkyl and aryl benzoates, alkyl and aryl hydroxybenzoates, alkaryl and aralkyl benzoates, and alkaryl and aralkyl hydroxybenzoates.

The malonic acid esters which are ultraviolet radiation absorbing compounds include the benzylidene malonates. These benzylidene malonates are represented by the general formula:

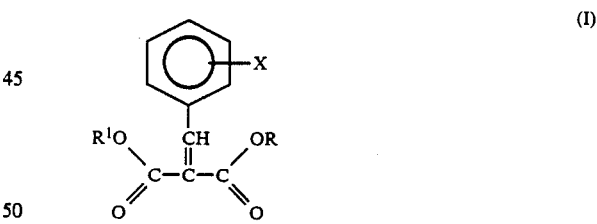

(I)

wherein X is selected from hydrogen, hydroxyl, halogen, alkyl, preferably $C_1$–$C_{10}$ alkyl, and alkoxy, preferably $C_1$–$C_{10}$ alkoxy, radicals; and R and $R^1$ are independently selected from alkyl radicals, preferably alkyl radicals containing from 1 to about 10 carbon atoms, substituted alkyl radicals, preferably those containing from 1 to about 10 carbon atoms and hydroxyl or halogen substituents, aryl radicals, preferably the phenyl radical, alkaryl radicals, preferably those alkaryl radicals containing from 7 to about 12 carbon atoms, aralkyl radicals, preferably aralkyl radicals containing from 7 to about 12 carbon atoms, and substituted aryl radicals, preferably phenyl radicals containing hydroxyl or halogen substituents. Preferred benzylidene malonates represented by Formula I are those wherein X represents an alkoxy group and R and $R^1$ are independently selected from alkyl radicals. Examples of these benzylidene malonates include diethyl paramethoxybenzylidene malonate and dimethyl paramethoxybenzylidene malonate.

Among the cyano-acrylates which are useful ultraviolet radiation absorbers are those cyano-acrylates represented by the general formula:

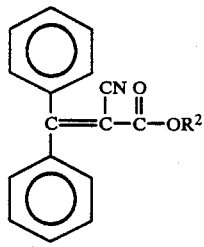
(II)

wherein $R^2$ is alkyl or hydroxyalkyl. These compounds of Formula II are disclosed in U.S. Pat. No. 4,129,667, which is incorporated herein by reference.

The preferred ultraviolet radiation absorbing compounds, for the purposes of the present process, are the benzophenones and benzophenone derivatives, benzotriazoles.

A specifically preferred ultraviolet radiation screener is 2,4 dihydroxy benzophenone:

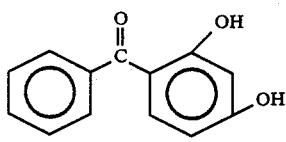
(III)

which is available from GAF as Unival 400.

Another suitable ultraviolet radiation screener is a benzophenone represented by the general formula:

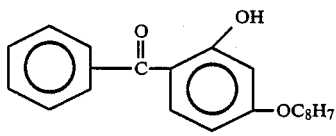
(IV)

sold under the trademark Cyasorb UV 531 by American Cyanamid.

The most preferred ultraviolet radiation screener employed in the composition of the present invention is a benzotriazole of the formula:

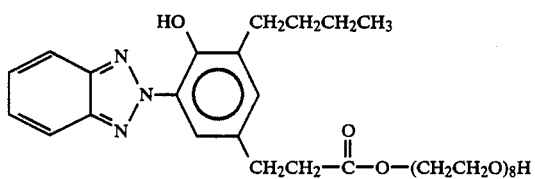
(V)

This benzotriazole is available from Ciba-Geigy under the trademark Tinuvin 1130.

Dipropylene glycol methyl ether has a molecular weight of 148.2, a boiling point of 188.3° C., a specific gravity of 0.951 at 25° C. and may be represented by the following formula:

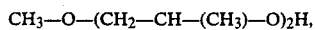

$$CH_3-O-(CH_2-CH-(CH_3)-O)_2H, \quad (VI)$$

and is available from Dow Chemical Company, Midland Mich.

Tripropylene glycol methyl ether can be represented by the formula:

$$HO-(C_3H_6O)_2-C_3H_6OCH_3 \quad (VII)$$

has a density of 0.961 at 25° C., a boiling point of 242° C., a viscosity of 5.5 cp at 25° C. and is a colorless liquid.

1,2 propanediol, also known as 1,2-propylene glycol, has a boiling point of 187.3° C., a density of 1.0381 at 20° C., and can be represented by the formula:

$$CH_3CHOHCH_2OH, \quad (VIII)$$

and is commercially available.

1,4 butanediol, also known as 1,4-butylene glycol, has a boiling point of 230° C., can be represented by the formula:

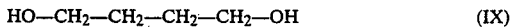

$$HO-CH_2-CH_2-CH_2-CH_2-OH \quad (IX)$$

and is commercially available.

The composition preferably contains the ultraviolet radiation screener at a level of from 3 to 20 percent by weight of the composition based on the total weight of the composition, more preferably from 5 to 15 percent by weight thereof, and most preferably 10 percent by weight thereof; and the carrier solution is preferably present at a level of from 97 to 80 percent by weight of the composition based on the total weight of the composition, more preferably is present at a level of 95 to 85 percent by weight thereof, and most preferably is present at a level of 90 percent by weight thereof.

The carrier solution contains respective amounts of dipropylene glycol methyl ether, tripropylene glycol methyl ether, 1,2 propanediol, and 1,4 butanediol. Preferably the dipropylene glycol methyl ether is present in the carrier solution at a level of from 30 to 80 percent by weight of the carrier solution based on the total weight of the carrier solution, more preferably is present at a level of from between 35 to 60 percent by weight thereof, and most preferably at a level of 42 percent by weight thereof; preferably the tripropylene glycol methyl ether is present at a level of from 0 to 25 percent by weight based on the total weight of the carrier solution, more preferably at a level of 10 to 22 percent by weight thereof, and most preferably at a level of 18 percent by weight thereof; preferably the 1,2 propanediol is present at a level of from 20 to 50 percent by weight of the carrier solution based on the total weight of the carrier solution, more preferably being present at a level of 25 to 40 percent by weight thereof, and most preferably being present at a level of 28 percent by weight thereof; and preferably the 1,4 butanediol is present at a level of from 0 to 15 percent by weight of the carrier solution based on the total weight of the carrier solution, more preferably being present at a level of from 10 to 15 percent by weight thereof, and most preferably being present at a level of 12 percent by weight thereof.

The preferred composition includes amounts of tripropylene glycol methyl ether and 1,4 butanediol for improved levels of surface impregnation. Failure to include respective amounts of tripropylene glycol methyl ether and 1,4 butanediol in the composition results in the screener being able to attain only a minimum acceptable degree of surface impregnation of the polycarbonate sheet. The incorporation of amounts of tripropylene glycol methyl ether and 1,4 butanediol in the composition results in improved penetration of the screener into the surface of the polycarbonate sheet but if the levels of tripropylene glycol methyl ether and 1,4 butanediol are too high then too much solvent attack at the surface can occur resulting in an undesirable breakdown of the polycarbonate resin and a reduction in the clarity of the resin.

The preferred composition includes amounts of dipropylene glycol methyl ether and 1,2 propanediol. The presence of respective amounts of dipropylene glycol methyl ether and 1,2 propanediol increases the volatility of the composition and reduces the composition aggressiveness.

The present surface impregnation composition permits on-line surface impregnation of hot polycarbonate sheet as it is produced and achieves acceptable levels of surface pentration by the screener, minimum breakdown of the surface resin and appropriate levels of volatility at the temperature of the hot sheet. The carrier solution provides the composition with a level of volatility that results in the composition staying on the hot sheet long enough for screener penetration of the surface of the sheet but that does not result in the composition staying on the sheet so long that substantial resin breakdown occurs or staying on the sheet for such a short period that adequate surface impregnation is not achieved. Although the composition of the present invention finds utility in surface impregnating polycarbonate sheet and film at temperatures between room temperature and 210° F., the composition finds particular utility in surface impregnating hot polycarbonate sheet and film having temperatures of from for example 150° F.–210° F., and more particularly 180° F.–210° F.

What is claimed:

1. An on-line process for producing ultraviolet radiation resistant polycarbonate sheet, said process comprising:
   (a) melt extruding an aromatic polycarbonate resin into a polycarbonate sheet;
   (b) applying an ultraviolet radiation screener composition to a surface of said sheet, said composition comprising an ultraviolet radiation screener and a carrier solution, said carrier solution comprising respective amounts of dipropylene glycol methyl ether, tripropylene glycol methyl ether, 1,2 propanediol, and 1,4 butanediol, said dipropylene glycol methyl ether being present at a level of from 30% to 80% by weight of said carrier solution based on the total weight of said carrier solution, said tripropylene glycol methyl ether being present at a level of from 10% to 22% by weight of said carrier solution based on the total weight of said carrier solution, said 1,2 propanediol being present at a level of from 20% to 50% by weight of said carrier solution based on the total weight of said carrier solution, said 1,4 butanediol being present at a level of from 10% to 15% by weight of said carrier solution based on the total weight of said carrier solution, said sheet being at a temperature of from between 150° F.–210° F. at the time said screener composition is applied; and
   (c) evaporating said carrier solution from the surface of said sheet.

2. The process of claim 1 wherein said evaporating involves applying heat to said surface.

3. The process of claim 1 wherein said sheet has a temperature of from between 180° F. and 210° F.

* * * * *